United States Patent [19]

Kashiwazaki

[11] Patent Number: 5,781,706
[45] Date of Patent: Jul. 14, 1998

[54] REDUCING MEMORY CAPACITY REQUIREMENTS IN IMAGE OUTPUT WHILE MAINTAINING OUTPUT SPEED

[75] Inventor: Masami Kashiwazaki, Kawasaki, Japan

[73] Assignee: Canon Kabushiki Kaisha, Tokyo, Japan

[21] Appl. No.: 551,445

[22] Filed: Nov. 1, 1995

Related U.S. Application Data

[63] Continuation of Ser. No. 154,112, Nov. 18, 1993, abandoned.

[30] Foreign Application Priority Data

Nov. 20, 1992 [JP] Japan ................................ 4-333750

[51] Int. Cl.⁶ ........................................................ G06F 15/00
[52] U.S. Cl. ................ 395/101; 395/140; 395/501; 382/141; 382/209
[58] Field of Search ........................ 395/101, 140, 395/501; 382/141, 209

[56] References Cited

U.S. PATENT DOCUMENTS

| | | |
|---|---|---|
| 5,068,805 | 11/1991 | Tsuzuki .................................. 395/164 |
| 5,084,831 | 1/1992 | Morikawa et al. ..................... 395/116 |
| 5,104,245 | 4/1992 | Oguri et al. ............................ 400/68 |
| 5,108,207 | 4/1992 | Isobe et al. ............................. 400/70 |
| 5,129,049 | 7/1992 | Cuzzo et al. ........................... 395/113 |
| 5,148,293 | 9/1992 | Miyachi .................................. 358/444 |
| 5,159,681 | 10/1992 | Beck et al. ............................. 395/425 |
| 5,237,645 | 8/1993 | Nagata et al. .......................... 395/115 |
| 5,293,463 | 3/1994 | Masuda .................................. 395/101 |
| 5,361,329 | 11/1994 | Morita et al. .......................... 395/102 |

Primary Examiner—Krisna Lim
Attorney, Agent, or Firm—Fitzpatrick, Cella, Harper & Scinto

[57] ABSTRACT

An output apparatus comprises a calculation unit for analyzing information received page by page while dividing the information into a plurality of areas to calculate bit map development time for each area, a discrimination unit for determining whether that area having the longest bit map development time calculated by the calculation unit can be developed into a bit map or not with a presecured minimum capacity of development memory, and a control unit for controlling the capacity of the secured development memory in accordance with that longest bit map development time.

20 Claims, 5 Drawing Sheets

REDUCING MEMORY CAPACITY REQUIREMENTS IN IMAGE OUTPUT WHILE MAINTAINING OUTPUT SPEED

This application is a continuation of application Ser. No. 08/154,112, filed Nov. 18, 1993, now abandoned.

BACKGROUND OF THE INVENTION

1. Field of the Invention

The present invention relates to an output apparatus for outputting an image in accordance with information inputted from an external device such as a host computer, and a memory control method in the output apparatus.

2. Related Background Art

Figure 5:
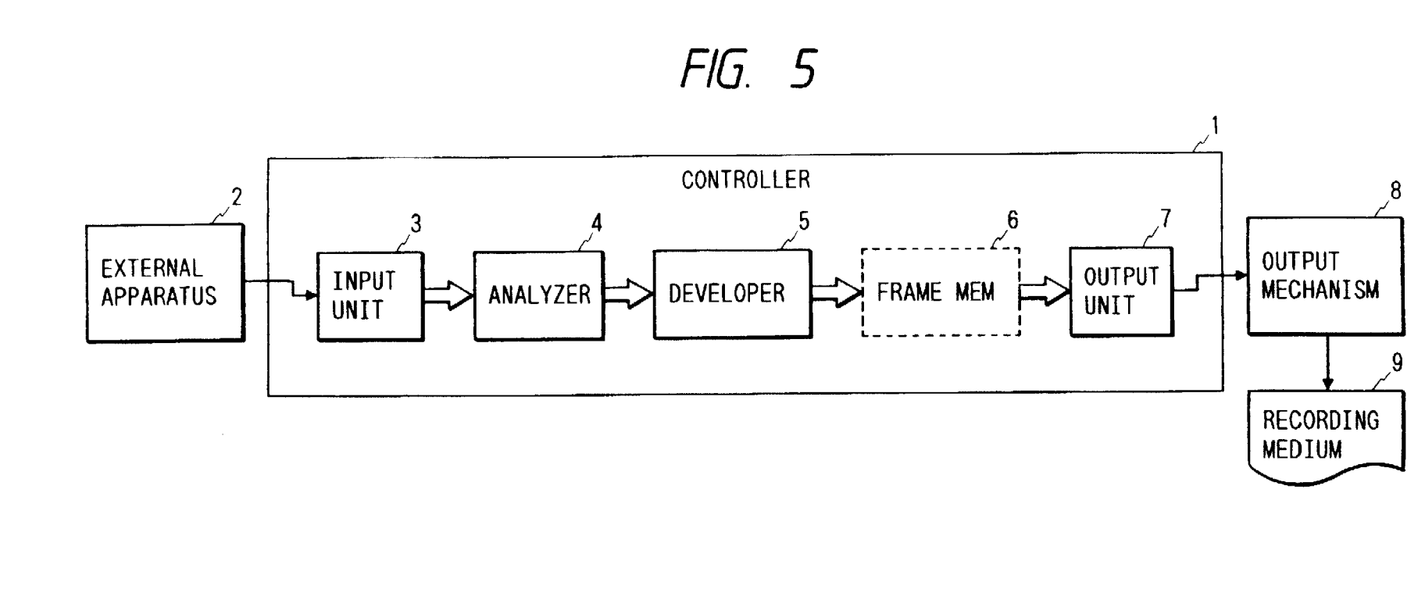
FIG. 5 shows a block diagram for illustrating a control unit of a printer as an example of a prior art information processing unit.

FIG. 5 shows a block diagram of a configuration of a control unit of a printer which is an example of a prior art device.

In FIG. 5, numeral 1 denotes a control unit which processes data from an external device 2 such as a host computer for outputting print data and outputs an output image to an output mechanism 8. Numeral 3 denotes an input unit for receiving data, numeral 4 denotes an analyzing unit for analyzing the data, numeral 5 denotes a developing unit for developing the data into an output image in a bit map memory in accordance with the development by the developing unit 4, numeral 6 denotes a frame memory for storing the developed output image, which comprises a RAM, numeral 7 denotes an output unit for controlling the output mechanism 8 by a laser beam in accordance with the contents of the frame memory 6, and numeral 9 denotes a recording medium such as a sheet.

In the control unit 1, the input unit 3 receives the print data outputted from the output apparatus 2 and the analyzing unit 4 analyzes the data. In accordance with the analysis, the developing unit 5 produces the output image on the frame memory 6 in the form of a binary bit map memory for one page or one divided area of the page. The output unit 7 controls the turning on/off of the laser beam for the output mechanism 8 in accordance with the contents of the frame memory 6 to record the print result on the recording medium such as a sheet.

In the prior art device, however, in order to secure a bit map memory area which is suitable for the development, the frame memory 6 may comprise one page area. In this case, however, a very large volume of memory is occupied by the frame memory. For example, when it is attempted to develop a bit map memory for a binary signal of size A4 at a resolution of 600 DPI (dots per inch), 4M bytes of memory per page is required, and if a multi-value output or a color output is required, several times more memory area is required.

In order to solve the problem of the memory capacity, it has been proposed to divide one page into a predetermined number of areas, and construct a frame memory having a fixed size smaller than one page in accordance with the divided area.

In this case, the development into the frame memory 6 by the developing unit 5 and the readout from the frame memory 6 by the output unit 7 should be simultaneously effected. Thus, where a large volume of output image is to be developed into one area, the development takes so long that a correct output image cannot be produced. In order to avoid the above problem, a frame memory should be secured with an enough margin.

SUMMARY OF THE INVENTION

It is an object of the present invention to provide an output apparatus and a memory control method in the output apparatus in which a bit map data development time for each of divided areas of a predetermined size divided from page by page output information is calculated to properly control a capacity of the frame memory which is secured at a minimum size to suppress the memory capacity allocated to the frame memory and effectively utilize the memory resources.

In order to achieve the above object, the output apparatus of the present invention comprises:

information received page by page while dividing the information into a plurality of areas to calculate a bit map development time for each area;

discrimination means for determining whether the area having the longest bit map development time calculated by the calculation means can be developed into a bit map or not with a presecured minimum capacity of development memory; and control means for controlling the capacity of the secured development memory in accordance with the longest bit map development time based on the determination by the discrimination means.

Further, in order to achieve the above object, the memory control method of the present invention comprises the steps of:

analyzing information received page by page while dividing the information into a plurality of areas to calculate a bit map development time for each area;

determining whether the area having the longest calculated bit map development time can be developed into a bit map or not with a presecured minimum capacity of development memory; and controlling the capacity of the secured development memory in accordance with the longest bit map development time based on the determination.

Since the bit map development time for each area divided from the received information can be captured, the capacity of the development memory can be controlled and the memory resources can be effectively utilized.

DETAILED DESCRIPTION OF THE PREFERRED EMBODIMENTS

Figure 1:
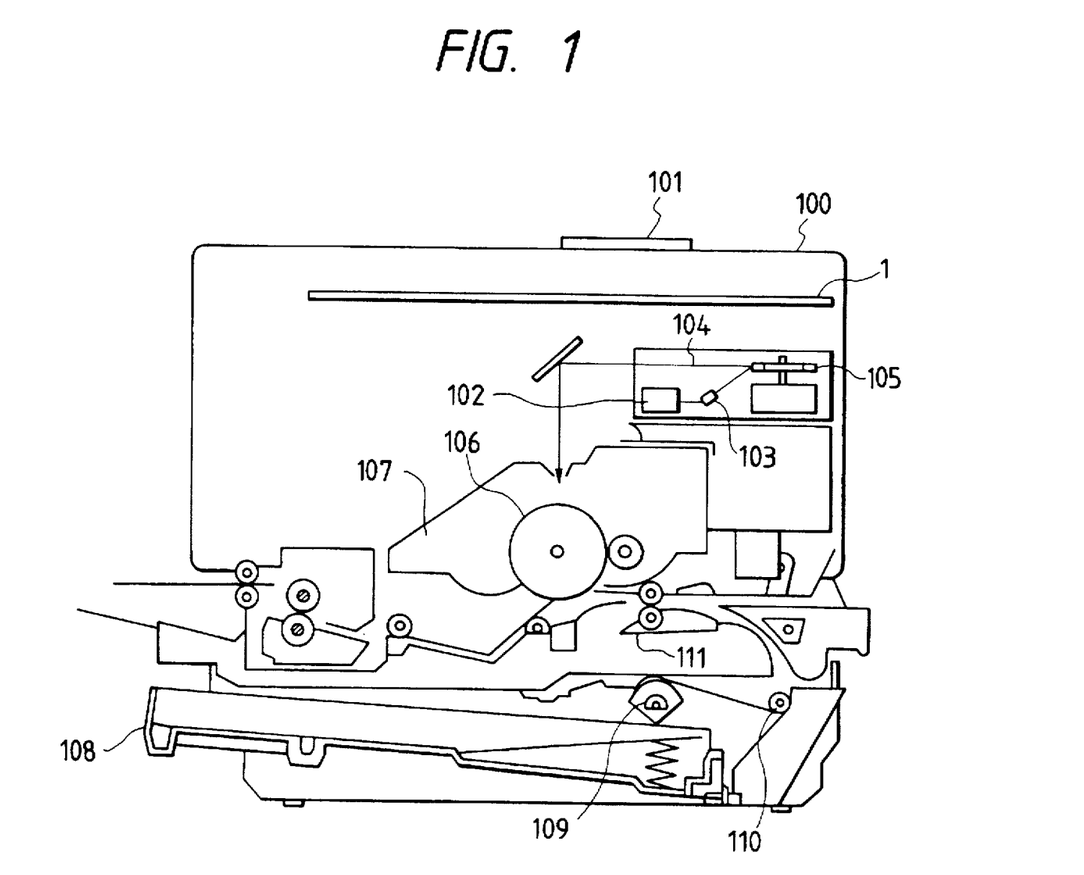
FIG. 1 shows a sectional view of a construction of a recorder to which an information processing method of one embodiment of the present invention is applied.

FIG. 1 shows a sectional view of a construction of a recorder such as a laser beam printer (LBP) to which an information processing method of one embodiment of the present invention is applied. The laser beam printer can register character patterns and form data from a data source, not shown.

In FIG. 1, numeral 100 denotes an LBP main unit which receives and stores character information (character codes) and form information or a macro instruction from a connected external device (for example, like the external device 5 shown in FIG. 5), and prepares corresponding character patterns and form patterns in accordance with that information and forms an image on a record sheet (recording medium). Numeral 101 denotes a console panel on which operation switches and LCD and LED displays are mounted, and numeral 1 denotes a control unit which controls the entire LBP main unit 100 and analyzes the character information supplied from the external device. The control unit 1 converts the character information to a video signal (output information) of corresponding character patterns and supplies it to a laser driver 102.

The laser driver 102 drives a semiconductor laser 103 which turns on and off a laser beam 104 emitted from the semiconductor laser 103 in accordance with an input video signal. The laser beam 104 is deflected to the left and right by a rotating polygonal mirror 105 to scan on an electrostatic drum 106. Thus, an electrostatic latent image of the character pattern is formed on the electrostatic drum 106. The latent image is developed by a developing unit 107 arranged around the electrostatic unit and then transferred to a record sheet. The record sheet may be a cut sheet the cut sheets being accommodated in a sheet cassette 108 mounted on the LBP main unit 100 and the sheet is fed into the device by a sheet feed roller 109 and sheet transport rollers 110 and 111 and is supplied to the electrostatic drum 106.

Figure 2:
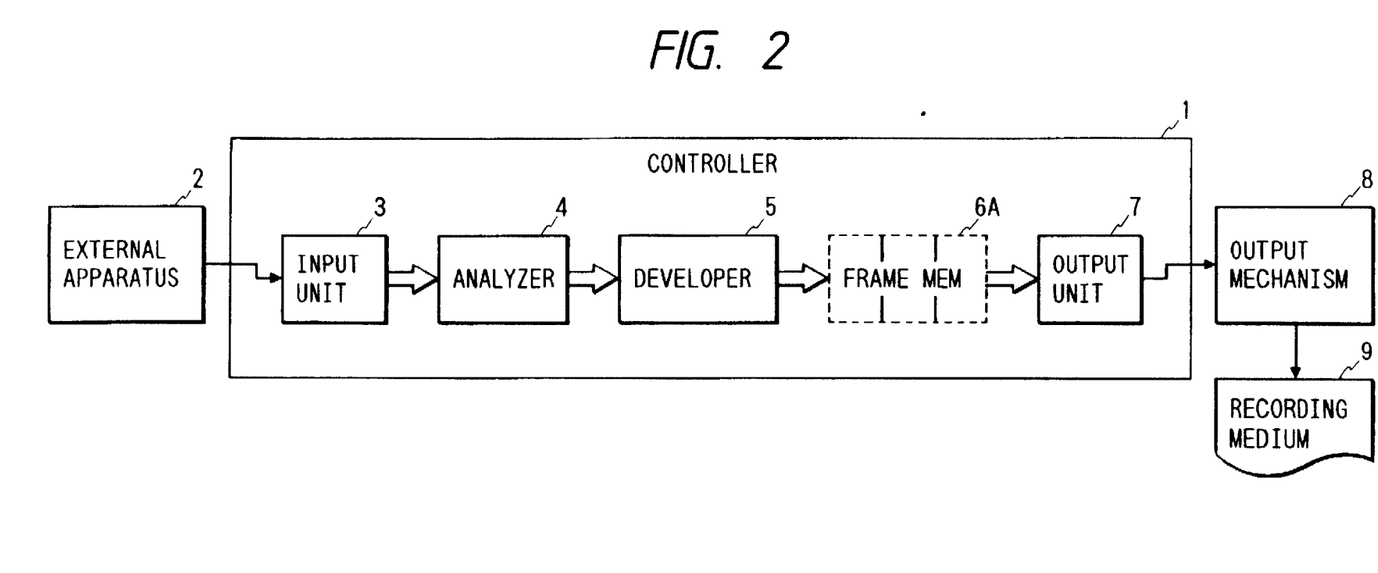
FIG. 2 shows a block diagram of a data processing circuit of a control unit shown in FIG. 1.

FIG. 2 shows a block diagram of a data processing process of the control unit 1 shown in FIG. 1. The like elements to those of FIG. 5 are designated by the like numerals.

In FIG. 2, numeral 6A denotes a frame memory, which, unlike the frame memory 6 shown in FIG. 5, does not need to be as large as one page of memory but needs only to have a capacity which can cover one divided area.

In the present embodiment, print information (comprising character codes and control codes) transferred from the external device 2 such as a host computer is temporarily stored in the input unit 3 and is then sent out to the analyzing unit 4. The analyzing unit 4 determines particular print information to be developed into particular divided areas (hereinafter referred to as paint segments), and if it is determined for each paint segment that the current frame memory size has too long a development time to print out the data correctly, it expands the frame memory size to comply with the development time. The information processed by the analyzing unit 4 is sent out to the development unit 5 so that the paint segment information corresponding to the frame memory size is developed on the frame memory 6A as the output information (bit map data). The output unit 7 controls the turning on/off of the laser beam for the output mechanism 8 in accordance with the frame memory 6A to record the print result on the recording medium 12 such as a sheet.

An operation of the analyzing unit 4 shown in FIG. 2 is now explained with reference to a flow chart shown in FIG. 3.

Figure 3:
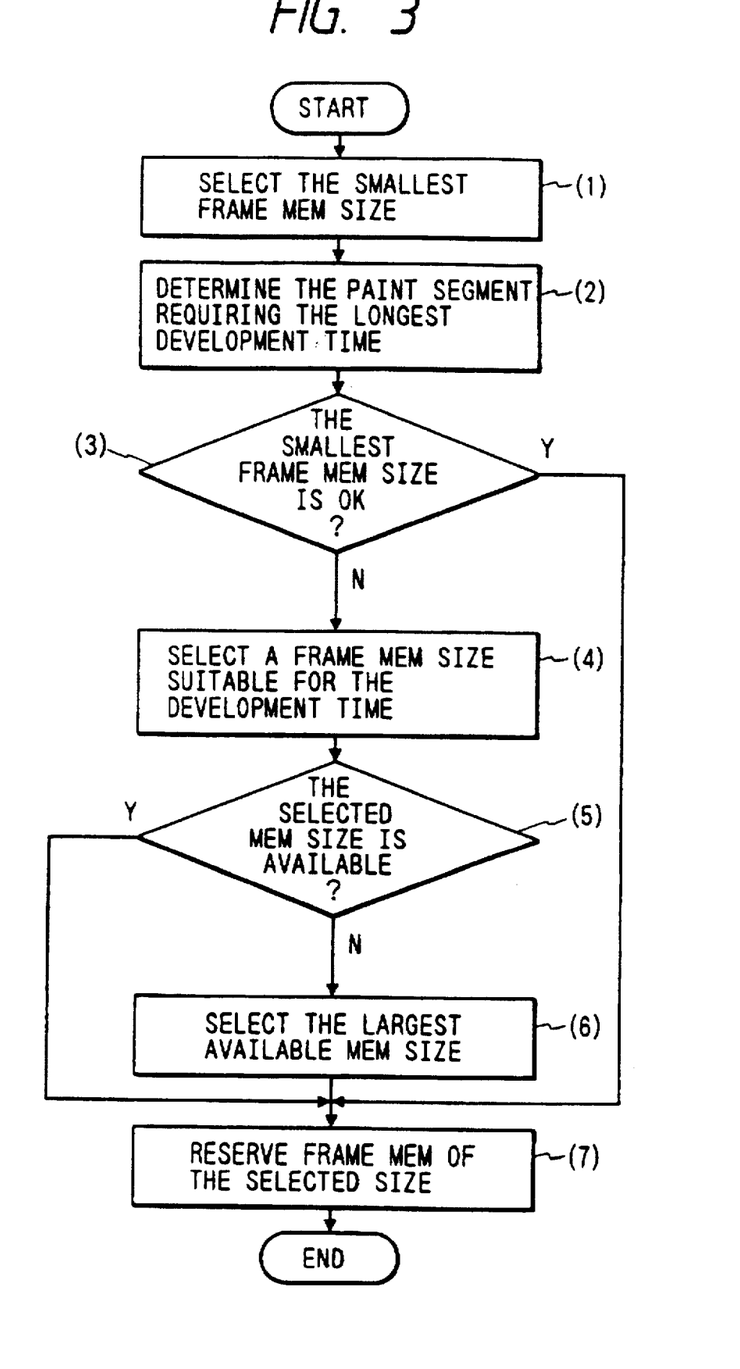
FIG. 3 shows flow chart of a data analysis process of an analyzing unit shown in FIG. 2.

FIG. 3 shows a flow chart of a print information analyzing process of the analyzing unit 4 shown in FIG. 2. Numerals (1) to (7) designate steps.

In the analyzing unit 4, the developing time of each paint segment is summed during the analysis of one page, and after the analysis of one page, a minimum frame memory size is selected in a step (1) and then a paint segment having a longest development time is determined in a step (2). In a step (3), whether the minimum frame memory size is large enough for the development time determined in the step (2) or not determined, and if it is large enough, the process proceeds to a step (7) where the minimum frame memory is secured and the process is terminated.

On the other hand, if it is not large enough in the step (3), a minimum frame size which is large enough for the development time is selected in a step (4). Then, in a step (5), whether the frame memory size selected in the step (4) can actually be secured or not is determined, and if it can, the process proceeds to the step (7). If it cannot, for example, if a large volume of download font or an overlay is recorded, the memory size is changed to a possible maximum memory size in a step (6). The frame memory area is actually secured and the process is terminated.

In the information processing method of the present invention, the input page by page print information is divided into a plurality of areas, the bit map development time for each area is calculated based on the analysis, the predetermined minimum capacity of frame memory is secured after the calculation, a determination is made as to whether the area which requires the longest bit map development time can be developed into the secured frame memory size or not, the secured frame memory size is expanded in accordance with the longest bit map development time based on that determination, and the minimum capacity frame memory size is resecured after the bit map development of the page after the expansion of the frame memory size. Accordingly, the page by page print information can be developed into the bit map without delay, merely by securing the minimum required frame memory.

Figure 4:
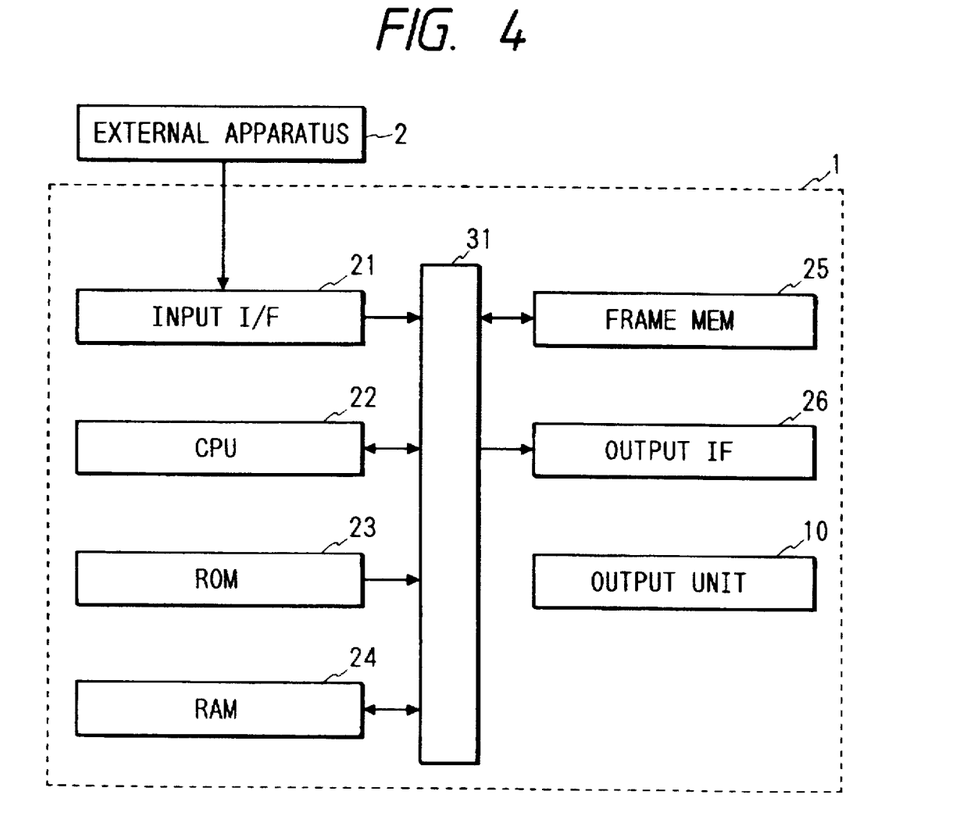
FIG. 4 shows a block diagram of a circuit configuration of the control unit of FIG. 2.

FIG. 4 shows a block diagram of a circuit of the control unit 1 shown in FIG. 2. The like elements to those of FIG. 2 are designated by the like numerals.

In FIG. 4, numeral 21 denotes an input interface for inputting the print information from the external device 2, numeral 22 denotes a CPU which controls the overall control unit 1 and centrally controls the data processing with the respective units in accordance with a control program (including an analysis program shown in FIG. 3) stored in a ROM 23. The ROM 23 also stores character font pattern data (one or both of outline data and bit map data). Numeral 24 denotes a RAM which serves as a work area for the CPU 22 and used for a receiving buffer for storing the print information received from the external device 2 and a page data buffer for storing page data for constructing output information for each paint segment from the received print information. Numeral 25 denotes a frame memory for developing the print information into the output information and the memory size thereof changes with the development time of the paint segment. The frame memory may also be constructed as a RAM. Those elements are connected to a system bus 31. Numeral 10 denotes an output unit and numeral 26 denotes an output interface.

In the information processing unit thus constructed, the CPU 22 analyzes the input page by page output information while it divides the information into a plurality of areas, calculates the bit map development time for each area based on the analysis, and after the calculation of the bit map development time, secures the predetermined minimum capacity frame memory 25, determines whether the area which requires the longest bit map development time can be developed into the bit map with the secured frame memory size, and expands the secured minimum frame memory size in accordance with the longest bit map development time based on the determination. Accordingly, even if print information which is too large to develop into the secured minimum frame memory size is received, a frame memory size which is large enough to develop into the bit map can be resecured, and the CPU 22 instruct to resecure the minimum capacity frame memory in response to the completion of the bit map development of the page so that the frame memory allocation for the entire memory resource is optimized.

In the present embodiment, the laser beam printer is used as the processing unit, although other recording or display devices such as an LED, LCD, ink jet printer (including bubble jet) or CRT display may be used. The number of colors to be printed may be either single or plural (color). While the development time is calculated and the current frame memory size is expanded in the present embodiment, the present invention can be equally applied when the current frame memory size is reduced.

What is claimed is:

1. An output apparatus for outputting image data to printing means, said output apparatus comprising:

drawing means for drawing a pattern divided into a plurality of segments by a segment unit in a variable size of area of a memory, wherein the pattern corresponds to one page of input data;

calculating means for calculating, for each pattern segment, a time required to draw the pattern segment in a predetermined size of memory area, prior to pattern drawing by said drawing means;

deriving means for deriving a second size greater than the predetermined size based on the required time calculated by said calculating means if the calculated time is greater than a predetermined time for at least one pattern segment; and control means for controlling said drawing means to draw the pattern by the segment unit in the second size of memory area derived by said deriving means when the calculated time is greater than the predetermined time for at least one pattern segment.

2. An apparatus according to claim 1, wherein reading of a pattern segment from the memory, outputting of the read pattern segment to the printing means, and drawing of a next pattern segment to the memory are performed in parallel.

3. An apparatus according to claim 1, further comprising means for resecuring, after drawing of a pattern, another size of memory area for a next pattern.

4. An apparatus according to claim 1, wherein the printing means comprises a laser beam printer.

5. An apparatus according to claim 1, wherein said drawing means draws the pattern based on data comprising character code or control code received from a host computer.

6. A printing apparatus comprising:

drawing means for drawing a pattern divided into a plurality of segments by a segment unit in a variable size of area of a memory, wherein the pattern corresponds to one page of input data;

calculating means for calculating, for each pattern segment, a time required to draw the pattern segment in a predetermined size of memory area, prior to pattern drawing by said drawing means;

deriving means for deriving a second size greater than the predetermined size based on the required time calculated by said calculating means if the calculated time is greater than a predetermined time for at least one pattern segment;

control means for controlling said drawing means to draw the pattern by the segment unit in the second size of memory area derived by said deriving means when the calculated time is greater than the predetermined time for at least one pattern segment; and printing means for printing an image based on the pattern drawn by said drawing means.

7. An apparatus according to claim 6, wherein reading of a pattern segment from the memory, outputting of the read pattern segment to said printing means, and drawing of a next pattern segment to the memory are performed in parallel.

8. An apparatus according to claim 6, further comprising means for resecuring after drawing of a pattern, another size of memory area for a next pattern.

9. An apparatus according to claim 6, wherein said printing means comprises a laser beam printer.

10. An apparatus according to claim 6, wherein said drawing means draws the pattern based on data comprising a character code or control code received from a host computer.

11. A method of outputting image data to printing means, comprising the steps of:

prior to drawing a pattern divided into a plurality of segments by a segment unit, calculating, for each pattern segment, a time required to draw the pattern segment in a predetermined size of area of a memory area;

deriving a second size greater than the predetermined size based on the calculated required time if the calculated time is greater than a predetermined time for at least one pattern segment; and controlling the memory to have the derived second size of memory area as an area in which the pattern is to be drawn by the segment unit when the calculated time is greater than the predetermined time fox at least one pattern segment.

12. A method according to claim 11, wherein reading of a pattern segment from the memory, outputting of the read pattern segment to the printing means and drawing of a next pattern segment to the memory are performed in parallel.

13. A method according to claim 11, further comprising the step of resecuring, after drawing of a pattern, another size of memory area for a next pattern.

14. A method according to claim 11, wherein the printing means comprises a laser beam printer.

15. A method according to claim 11, further comprising the step of drawing the pattern based on data comprising a character code or control code received from a host computer.

16. A printing system comprising:

a host computer; and a printing apparatus for performing printing based on data sent by said host computer, said printing apparatus comprising:

drawing means for drawing a pattern divided into a plurality of segments by a segment unit in a variable size of area of a memory, wherein the pattern corresponds to one page of input data;

calculating means for calculating, for each pattern segment, a time required to draw the pattern segment in a predetermined size of memory area, prior to pattern drawing by said drawing means;

deriving means for deriving a second size greater than the predetermined size based on the required time calculated by said calculating means if the calculated time is greater than a predetermined time for at least one pattern segment;

control means for controlling said drawing means to draw the pattern by the segment unit in the second size of memory area derived by said deriving means when the calculated time is greater than the predetermined time for at least one pattern segment; and printing means for printing an image based on the pattern drawn by said drawing means.

17. A system according to claim 16, wherein reading of a pattern segment from the memory, outputting of the read pattern segment to said printing means, and drawing of a next pattern segment to the memory are performed in parallel.

18. A system according to claim 16, further comprising means for resecuring, after drawing of a pattern, another size of memory area for a next pattern.

19. A system according to claim 16, wherein said printing means comprises a laser beam printer.

20. A system according to claim 16, wherein said drawing means draws the pattern based on data comprising a character code or control code received from said host computer.

* * * * *

UNITED STATES PATENT AND TRADEMARK OFFICE
CERTIFICATE OF CORRECTION

PATENT NO. : 5,781,706
DATED : July 14, 1998
INVENTOR(S) : MASAMI KASHIWAYAKI

It is certified that error appears in the above-identified patent and that said Letters Patent is hereby corrected as shown below:

COLUMN 1

Line 55, Close up right margin;
Line 56, Close up left margin.

COLUMN 2

Line 10, "information" should read --calculation means for analysing information--;
Line 48, "flow chart" should read --a flowchart--.

COLUMN 3

Line 22, "sheet" should read --sheet,--;
Line 24, "unit 100" should read --unit 100,--.

UNITED STATES PATENT AND TRADEMARK OFFICE
CERTIFICATE OF CORRECTION

PATENT NO. : 5,781,706

DATED : July 14, 1998

INVENTOR(S) : MASAMI KASHIWAYAKI

It is certified that error appears in the above-identified patent and that said Letters Patent is hereby corrected as shown below:

COLUMN 5

Line 2, "instruct" should read --instructs--.

COLUMN 6

Line 32, "fox" should read --for--.

Signed and Sealed this

Eleventh Day of May, 1999

Attest:

Q. TODD DICKINSON

Attesting Officer

Acting Commissioner of Patents and Trademarks